United States Patent

[11] 3,624,104

[72] Inventors John W. Cusic
 Skokie, Ill.;
 William E. Coyne, St. Paul, Minn.
[21] Appl. No. 869,888
[22] Filed Oct. 27, 1969
[45] Patented Nov. 30, 1971
[73] Assignee G. D. Searle & Co.
 Chicago, Ill.

[54] ARALKANOYL DERIVATIVES OF DIBENZOXAZEPINE-N-CARBOXYLIC ACID HYDRAZIDES
4 Claims, No Drawings

[52] U.S. Cl............................................ 260/333,
 260/327 B, 424/244
[51] Int. Cl.............................................. C07d 87/54,
 C07d 93/42
[50] Field of Search.................................. 260/333,
 327, 327 B

[56] References Cited
UNITED STATES PATENTS
3,534,019 10/1970 Coyne et al.................. 260/333
OTHER REFERENCES
Coyne et al., Jour. Med. Chem., 11 (6) (1968) pp. 1158–1160.

Primary Examiner—Norma S. Milestone
Attorneys—John M. Brown, John J. Kolano, Elliot N. Schubert and Walter C. Ramm ABSTRACT: Disubstituted hydrazines wherein the 1-substituent is a dibenzoxazepine carbonyl group or a similar group, and where the 2-substituent is an aralkanoyl group are described herein. The compounds are prepared by reacting hydrazine first with one appropriate acid chloride and then with the second appropriate acid chloride. The compounds are useful as antihypercholesterolemic agents and as anti-inflammatory agents.

ARALKANOYL DERIVATIVES OF DIBENZOXAZEPINE-N-CARBOXYLIC ACID HYDRAZIDES

The present invention relates to a group of compounds which are disubstituted hydrazines in which one of the substituents is a tricyclic N-carbonyl group. More specifically, the present invention relates to a group of compounds having the following general formula

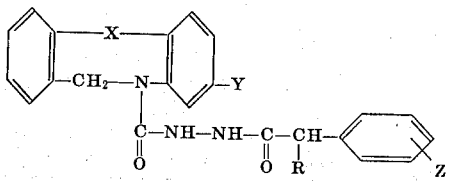

wherein X is selected from the group consisting of O and S; Y is selected from the group consisting of hydrogen, halogen, and trifluoromethyl; Z is selected from the group consisting of hydrogen, halogen, methyl, and methoxy; and R is selected from the group consisting of hydrogen and phenyl. The halogen atoms referred to above include fluorine, chlorine, bromine, and iodine.

The compounds of this invention are useful because of their pharmacological properties. More specifically, the present compounds display an antihypercholesterolemic utility which is evident from the results of a standardized test for their capacity to counteract the increased serum cholesterol induced in rats by the injection of Triton WR-1,339 and described by Garattini et al. in "Drugs Affecting Lipid Metabolism," p. 150, Elsevier, 1961. A group of 8 male rats each weighing approximately 250 g. is used for each compound tested. Dosage is 50 mg./kg. dissolved or suspended in 10 ml./kg. of an aqueous 4 percent solution of the Triton and administered intraperitoneally. A corresponding group of 8 rats each concurrently injected intraperitoneally with 10 ml./kg. of aqueous 4 percent Triton WR-1,339 containing no compound serves as controls. Exactly 18 hours after injection, the animals are anesthetized, and blood samples are taken from the abdominal aortas and analyzed for cholesterol. A compound is considered antihypercholesterolemic if it significantly ($T \leq 0.05$) decreases the mean cholesterol analysis relative to the control value. When tested in the above manner, 1-phenylacetyl-2-(8-chloro-10,11dihydrobenz[b,f][1,4]-oxazepine-10-carbonyl)hydrazine and 1-diphenylacetyl-2-(8-chloro-10,11-dihydrodibenz[b,f][1,4]oxazepine-10-carbonyl)hydrazine were found to be activeras antihypercholesterolemic agents.

The present compounds are also useful as anti-inflammatory agents in that they counteract both the edema which characterizes an inflammatory response to local tissue insult and also the edema associated with joint degeneration of the type observed in rheumatoid arthritis.

The present compounds have further been found to act as prostaglandin antagonists in that they specifically inhibit $PGE_2$. But, the present compounds do not demonstrate the anticonvulsant activity associated with some related compounds.

The compounds of the present invention are prepared by the reaction of an appropriate acid halide, preferably the acid chloride, with a semicarbazide of the formula

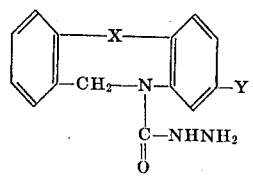

wherein X and Y are defined as above. The reaction is carried out in an inert solvent such as benzene in the presence of a tertiary amine such as triethylamine. Alternately, an aralkanoic acid hydrazide can be reacted with an acid chloride of the formula

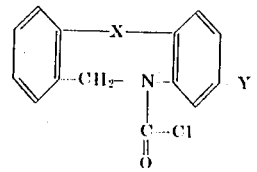

wherein X and Y are defined as above.

The following examples are presented to further illustrate the present invention; they should not be construed as limiting it in spirit or in scope. In these examples, quantities are indicated in parts by weight unless parts by volume are specified, and temperatures are indicated in degrees centigrade (° C.). The relationship between parts by weight and parts by volume is the same as that existing between grams and milliliters.

EXAMPLE 1

200 parts of 4-chloro-3-nitrobenzotrifluoride is heated to 160° C. and stirred and 160 parts of the potassium salt of salicylaldehyde is added over a period of 30 minutes. After the addition is complete, an exothermic reaction takes place and the temperature rises to about 195° C. Heating is then discontinued until the reaction subsides and the mixture is then heated for 1 hour at 150° C. The mixture is cooled ice and water are added, and it is then extracted with ether. The ether layer is filtered to remove insoluable material and the resultant solution is dried over sodium sulfate. The ether solvent is then evaporated and the residual oil is recrystallized from a mixture of hexane and benzene to give 2-(2-nitro-4-trifluoromethylphenoxy)benzaldehyde melting at about 79°–81° C.

A solution of 55 parts of the ether obtained in the preceding paragraph in 800 parts of ethanol is hydrogenated over Raney nickel catalyst at room temperature and atmospheric pressure. When hydrogen uptake ceases the catalyst is removed by filtration and the ethanol solvent is evaporated. The residue is then dissolved in 500 parts by volume of hexane, filtered, and then cooled. There is then obtained yellowish-white crystals which are separated by filtration to give 8-trifluoromethyl-10,11-dihydrodibenz-[b,f][1,4]oxazepine melting at about 86°–88° C.

EXAMPLE 2

13 parts of phosgene in 45 parts of toluene is stirred at 5°–10° C. and 70 parts of ether is added. This is followed by the addition of a solution of 18.9 parts of 8-trifluoromethyl-10,11-dihydrozenz*b,f*][1,4]oxazepine and 7.2 parts of triethylamine in 140 parts of ether. After the addition is complete, the mixture is stirred for 2 hours and then filtered and the solvent is evaporated from the filtrate. The residue is dissolved in 200 parts by volume of hot hexane and this mixture is then filtered and cooled. This gives 8-trifluoromethyl-10,11-dihydrodibenz[b,f][1,4]oxazepine-10-carbonyl chloride melting at about 102°–105° C.

EXAMPLE 30

To a stirred solution of 8 parts of phosgene in 30 parts of toluene at 5° C., there is added 50 parts of ether. This is followed by the addition of a solution of 12.4 parts of 10,11-dihydrodibenz*b,f*]d[1,4]oxazepine and 6.4 parts of triethylamine in 90 parts of ether while the temperature is maintained at about 7° C. with cooling. The resultant suspension is stirred for 1 hour after the addition is complete before it is filtered. The residue is washed with ether and the solvent is evaporated from the combined filtrates under reduced pressure. The resultant residue is then recrystallized from petroleum ether to give 10,11-dihydrodibenz[b,f][1,49 oxazepine-10-carbonyl chloride melting at about 109°–112° C.

If 8-chloro-10,11-dihydrodibenz[b,f][1,4]oxazepine is reacted with phosgene according to the procedure described in the preceding paragraph, the product obtained is 8-chloro-10,11-dihydrodibenz([b,f][1,4]oxazepine-10-carbonyl chloride. This compound melts at about 101°–104° C. after recrystallization from petroleum ether.

EXAMPLE 4

To a solution of 7.3 parts of 100 percent hydrazine hydrate in 40 parts of ethanol there is added, at 5–10° C. with stirring a solution of 13.0 parts of 10,11-dihydrodibenz[b,f][1,4]oxazepine-10-carbonyl chloride in 200 parts by volume of a 1:1 ether-methylene chloride solution. When the addition is complete, the mixture is allowed to warm to room temperature and stirred for 1 hour. The mixture is then filtered and the solvent is evaporated from the filtrate. The resultant residue is dissolved in chloroform and the chloroform solution is washed with water and dried over magnesium sulfate. The chloroform solvent is then evaporated and the resultant crude residue is triturated with petroleum ether to give a white solid which is then recrystallized from ethanol. The product thus obtained is 10,11-dihydrodibenz[b,f][1,4]oxazepine-10-carboxylic acid hydrazide melting at about 121°–124° C. This compound has the following formula

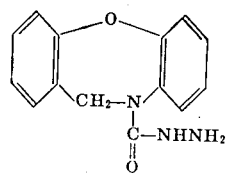

EXAMPLE 5

To a stirred solution of 3.3 parts of 100 percent hydrazine hydrate in 20 parts of ethanol at 5°–10° C. there is added a solution of 6.5 parts of 8-chloro-10,11-dihydrodizenz[b,f][1,4]oxazepine-10-carbonyl chloride in 100 parts by volume of a 1:1 ether-methylene chloride solution. The resultant suspension is stirred for 16 hours at room temperature and the ether and methylene chloride are then evaporated. The resulting suspension is then stirred with water and filtered to give a while crystalline product. This is recrystallized from ethanol to give 8-chloro-10,11-dihydrodibenz[b,f][1,4]oxazepine-10-carboxylic acid hydrazide melting at about 179°–181° C.

EXAMPLE 6

The procedure of example 5 is repeated using 6.6 parts of 8-trifluoromethyl-10,11-dihydrodibenz[b,f][1,4]oxazepine-10-carbonyl chloride and 2.5 parts of hydrazine hydrate. In this case, the crude residue obtained after evaporation of the ether and methylene chloride is diluted with water and then extracted with ether. The combined ether extracts are dried over magnesium sulfate and the solvent is then evaporated to leave a colorless oil containing some crystals. The oil is triturated with hexane and the crystalline material which forms is separated by filtration and recrystallized from a mixture of benzene and hexane to give 8-trifluoromethyl-10,11-dihydrobenz-[b,f][1,4]oxazepine-10-carboxylic acid hydrazide melting at about 111°–113° C.

EXAMPLE 7

The procedure of example 5 is repeated using 13.8 parts of 10,11-dihydrodibenzo[b,f][1,4]thiazepine-10-carbonyl chloride and 7.3 parts of 100 percent hydrazine hydrate. The product obtained is 10,11-dihydrodibenzo[b,f][1,4]-thiazepine-10-carboxylic acid hydrazide melting at about 140°–142° C.

EXAMPLE 8

Too a solution of 5.7 parts of 8-chloro-10,11-dihydrobizenz[b,f][1,4]oxazepine-10-carboxylic acid hydrazide in 225 parts of benzene there is added, at room temperature with stirring, 2.5 parts of triethylamine and then 3.1 parts of phenylacetyl chloride. The mixture is stirred for 1 hour at room temperature and then refluxed for 1 hour. The mixture is then cooled and 50 parts of water is added. The benzene layer is separated and the solvent is evaporated to leave a yellow oil which crystallizes on standing. The solid is recrystallized twice from ethanol and once from benzene and finally dried to give 1-phenylacetyl-2-(8-chloro-10,11-dihydrodibenz[b,f][1,4]oxazepine-10-carbonyl)hydrazine melting at about 157°–158° C. This compound has the following formula

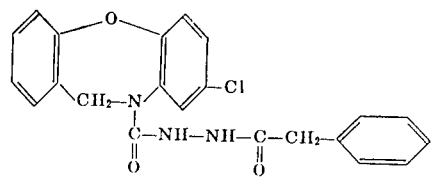

EXAMPLE 9

A solution is prepared from 5.7 parts of 8-chloro-10,11-dihydrodibenz[b,f][1,4]oxazepine-10-carboxylic acid hydrazide and 225 parts of benzene. To this solution is added 2.5 parts triethylamine and then a solution of 4.6 parts of diphenylacetyl chloride in 45 parts of benzene, drop wise with stirring. A white precipitate appears shortly after the addition. The mixture is stirred for 30 minutes at room temperature and then refluxed for 1 hour. It is then cooled and diluted with water and the precipitate which forms is separated by filtration and then recrystallized from ethanol to give 1-diphenylacetyl-2-(8-chloro-10,11-dihydrodibenz[b,f][1,4]oxazepine-10-carbonyl)hydrazine melting at about 204°–207° C.

EXAMPLE 10

If the procedure of example 8 is repeated using equivalent quantities of 10,11-dehydrodibenz[b,f][1,4]-oxazepine-10-carboxylic acid hydrazide, 8-trifluoromethyl-10,11-dihydrodibenz[b,f][1,4]oxazepine-10-carboxylic acid hydrazide, and 10,11-dihydrodibenzo[b,f][1,4]thiazepine-10-carboxylic acid hydrazide in place of the hydrazide used in that example, the products obtained are, respectively, 1-phenylacetyl-2-(10,11-dihydrodibenz[b,f][1,4]-oxezepine-10-carbonyl)hydrazine, 1-phenylacetyl-2-(8-trifluoromethyl-10,11-dihydrodibenz[b,f][1,4]oxazepine-10-carbonyl)hydrazine, and 1-phenylacetyl-2-(10,11-dihydrodibenzo[b,f]1,4]thiazepine-10-carbonyl)hydrazine.

EXAMPLE 11

If equivalent quantities of 4-methylphenylacetyl chloride, 4-chlorophenylacetyl chloride, and 4-methoxyphenylacetyl chloride are each substituted for the phenylacetyl chloride and the procedure of Example 8 is repeated, the products obtained are, respectively, 1-(4-methylphenylacetyl)-2-(8-chloro-10,11-dihydrodibenz[b,f][1,4]oxazepine-10-carbonyl)hydrazine, 1-(4-chlorophenylacetyl)-2-(8-chloro-10,11-dihydrodibenz[b,f][1,4]oxazepine-10-carbonyl)hydrazine, and 1-(4-methoxyphenylacetyl)-2-(8-chloro-10,11-dihydrodibenz[b,f][1,4]oxazepine-10-carbonyl)hydrazine.

What is claimed is:
1. A compound of the formula

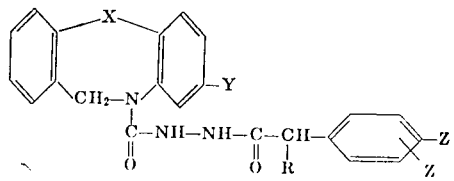

wherein X is selected from the group consisting of O and S; Y is selected from the group consisting of hydrogen, chlorine, and trifluoromethyl; Z is selected from the group consisting of hydrogen, methyl, chlorine, and methoxy; and R is selected from the group consisting of hydrogen and phenyl.

2. A compound according to claim 1 which is 1-phenylacetyl-2-(8-chloro-10,11-dihydrodibenz[b,f][1,4]-oxazepine-10-carbonyl)hydrazine.

3. A compound according to claim 1 which is 1-diphenylacetyl-2-(8-chloro-10,11-dihydrodibenz[b,f][1,4]-oxazepine-10-carbonyl)hydrazine.

4. A compound according to claim 1 which is 1-phenylacetyl-2-(10,11-dihydrodibenz[b,f][1,4]oxazepine-10-carbonyl)hydrazine.

* * * * *

FO-1050
(5/69)

UNITED STATES PATENT OFFICE
CERTIFICATE OF CORRECTION

Patent No. 3,624,104  Dated November 30, 1971

Inventor(s) John W. Cusic and William E. Coyne

It is certified that error appears in the above-identified patent and that said Letters Patent are hereby corrected as shown below:

Column 1, line 46, "11dihydrobenz[" should be -- 11-dihydrodibenz --.

Column 1, line 49, "activeras" should be -- active as --.

Column 2, line 55, "dihydrozenzb,f]" should be -- dihydrodibenz[b,f]--.

Column 2, line 65, "Example 30" should be -- Example 3 --.

Column 2, line 69, "dihydrodibenzb,f]d[1,4]" should be -- dihydrodibenz[b,f][1,4] --.

Column 3, line 1, "[1,49" should be -- [1,4] --.

Column 3, line 6, "dihydrodibenz([b,f]" should be -- dihydrodibenz[b,f] --.

Column 3, line 42 "dihydrodizenz" should be -- dihydrodibenz --.

Column 3, line 49, "while" should be -- white --.

Column 4, line 2, "Too" should be -- To --.

Column 4, line 3, "dihydrodizenz" should be -- dihydrodibenz --.

Column 4, line 30 "dipher" should be -- diphen --.

Column 4, line 41, "dehydrodibenz" should be -- dihydrodibenz --.

UNITED STATES PATENT OFFICE
CERTIFICATE OF CORRECTION

Patent No. 3,624,104                    Dated November 30, 1971

Inventor(s) John W. Cusic and William E. Coyne

It is certified that error appears in the above-identified patent and that said Letters Patent are hereby corrected as shown below:

- 2 -

Column 4, line 49, "oxezepine" should be -- oxazepine --.

Column 4, 2nd formula

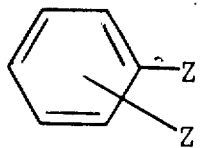   Should be --   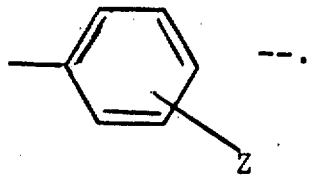   --.

Signed and sealed this 27th day of June 1972.

(SEAL)
Attest:

EDWARD M. FLETCHER, JR.
Attesting Officer

ROBERT GOTTSCHALK
Commissioner of Patents